Aug. 28, 1934.  F. W. SARGENT  1,971,579
BRAKE SHOE
Filed Dec. 5, 1932  2 Sheets-Sheet 1

Inventor:-
Fitz William Sargent
Wm O Belt
Attorney.

Aug. 28, 1934.  F. W. SARGENT  1,971,579
BRAKE SHOE
Filed Dec. 5, 1932  2 Sheets-Sheet 2

Inventor:-
Fitz William Sargent
By Wm O Belt
Attorney.

Patented Aug. 28, 1934

1,971,579

UNITED STATES PATENT OFFICE 1,971,579

BRAKE SHOE

Fitz William Sargent, Mahwah, N. J., assignor to The American Brake Shoe and Foundry Company, Wilmington, Del., a corporation of Delaware Application December 5, 1932, Serial No. 645,699

6 Claims. (Cl. 188—243)

This invention relates to brake shoes and more particularly to means for prolonging the life of a brake shoe after the body has been broken so that the shoe may be continued in service until worn out.

The body of a brake shoe is usually made of cast iron with or without inserts and chill sections and, because of the effect of friction heat and variation between the contour of the face of the shoe and the contour of the wheel with which it co-acts, the body of a shoe sometimes breaks in service. The shoe is subjected to vibration and to various shocks and jars in service and when the body is broken below the attaching lug the lower portion of the body is then held by the reenforce back embedded in the body at the back thereof. Thereafter the effect of vibration, shocks and jars is largely concentrated upon the reenforce back at the line of break in the body and the weight of the lower end of the broken body enhances the effect of vibration, shocks and jars.

The object of my invention is to provide means in addition to the reenforce back of a brake shoe for holding broken parts of the body of a brake shoe in place to continue in service until the body has reached its limit of wear.

And a further object is to overcome or at least materially reduce the effect of vibration, shocks and jars upon the reenforce back of a brake shoe after the body is broken and insure the retention of the broken parts of the body in place to continue in service and obtain the full braking effectiveness of the shoe until the body has reached its limit of wear.

I have illustrated a selected embodiment of the invention in the accompanying drawings in which Fig. 1 shows a brake shoe attached to a brake head and is partly in section;

Figs. 2 and 3 are transverse sectional views on the lines 2—2 and 3—3 of Fig. 1;

Figure 1:
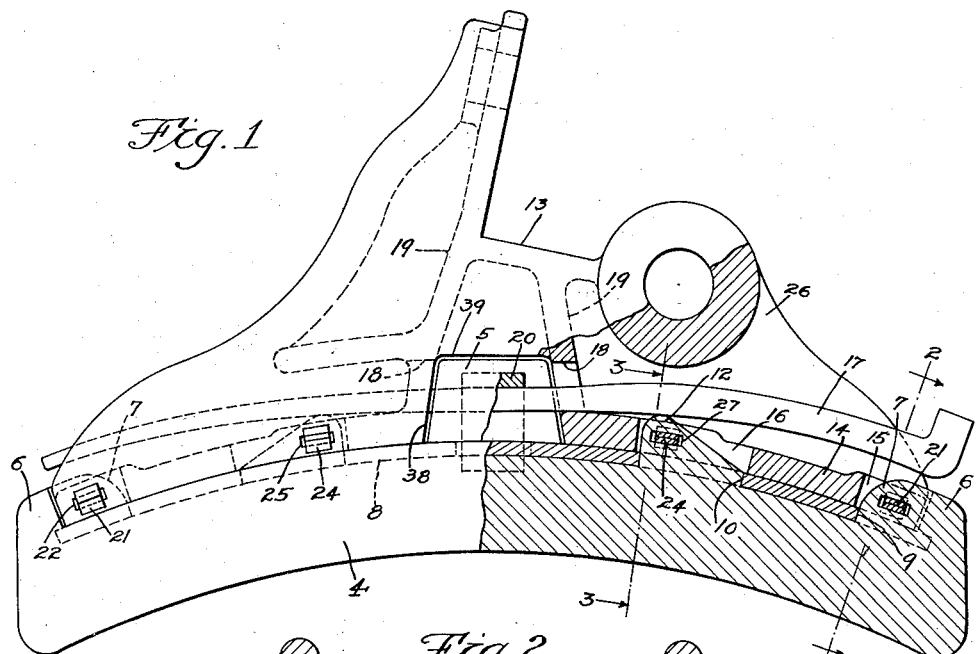
Figure 2:
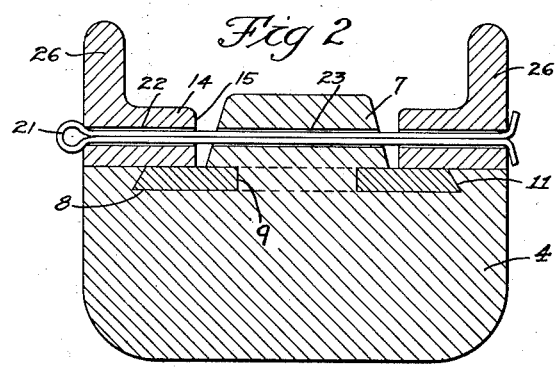
Figure 3:
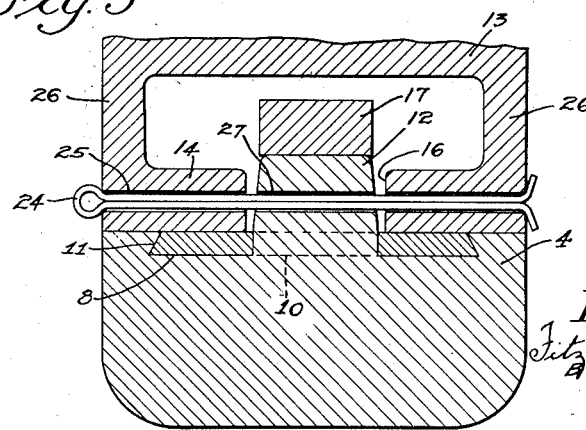

Referring to Figs. 1-3 of the drawings, the brake shoe comprises a body 4, an attaching lug 5, end lugs 6 and guide lugs 7. A reenforce back 8 is embedded in the body at the back thereof and it is provided with openings 9 at its ends and openings 10 between its ends and its middle. The edges 11 of the back are bevelled so that the body metal will anchor therewith when it is cast upon the back. The body metal will also flow through the openings 9 to form the guide lugs 7 and through the openings 10 to form the bearing lugs 12 on the shoes. The head 13 has a face plate 14 which is provided with openings 15 to receive the end lugs and openings 16 to receive the bearing lugs. The fastening key 17 passes through the attaching lug 5 of the brake shoe and through openings 18 in webs 19 of the brake head and bears upon the bearing lugs 12 to hold the brake shoe rigidly in place on the head. The usual form of attaching lug comprises a strap 20 which is embedded in the body metal during the casting operation. The bearing lugs are preferably of sufficient height with respect to the top of the lug strap 20 so that the fastening key will be deflected on both sides of the attaching lug when properly inserted for holding the shoe to the head, and this assists in holding the shoe rigidly as well as securely.

In addition to the anchorage of the body to the back and the lug strap, and in addition to the anchorage of the shoe to the head through the medium of the attaching lug and the key, I provide anchorages for the body directly to the head by means of keys 21 which pass through the openings 22 in the ends of the face plate of the head and openings 23 in the guide lugs 7, Fig. 2, and also keys 24 which pass through openings 25 in the face plate 14 of the head and openings 27 in the bearing lugs 12, Fig. 3, so that the body of the shoe is anchored independently of the reenforce back to the head by engagement of the keys 21 and 24 with parts of the body and the head.

Figure 4:
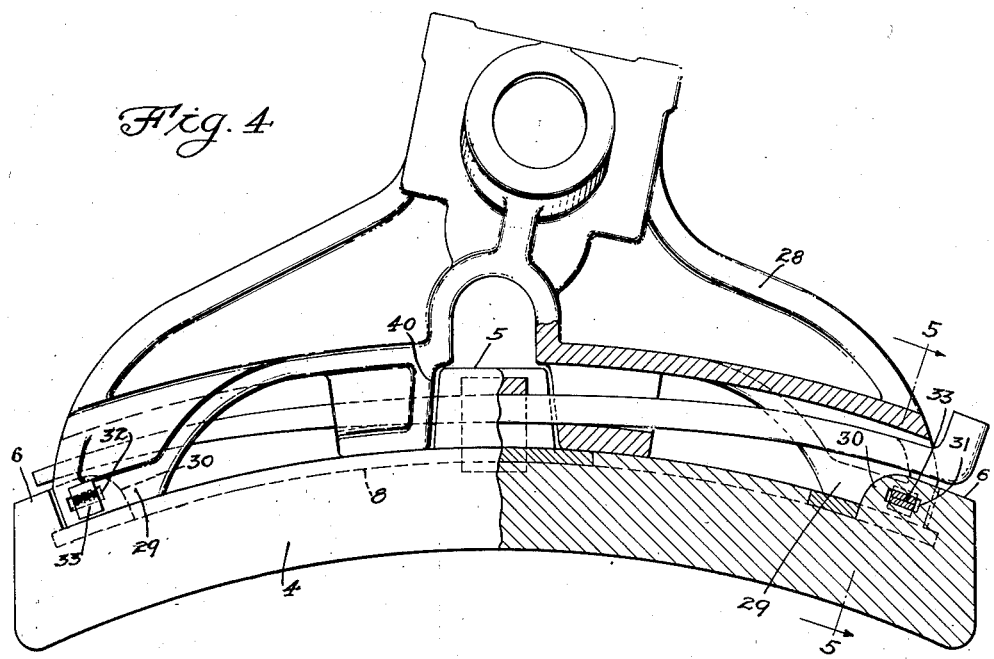
Fig. 4 shows a brake shoe attached to another type of brake head and is partly in section.
Figure 5:
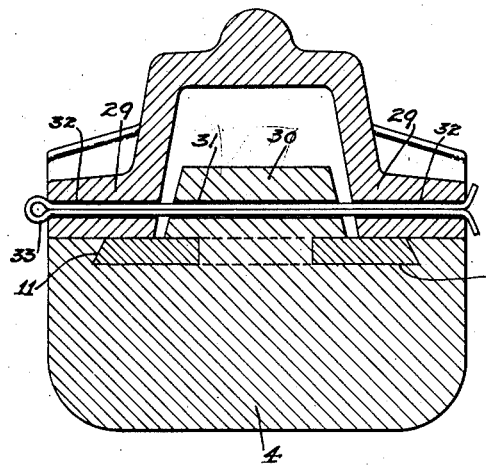
Fig. 5 is a transverse sectional view on the line 5—5 of Fig. 4 with the key omitted.

In Figs. 4 and 5, I have shown the invention embodied in another type of brake head 28 which does not have a face plate as shown in Figs. 1-3 but is shaped to form toes 29 at its ends which rest against the back of the shoe on opposite sides of the guide lugs 30. Each guide lug is provided with an opening 31 to register with openings 32 in the adjacent toes to receive the keys 33 in the manner and for the purpose hereinbefore described.

Figure 6:
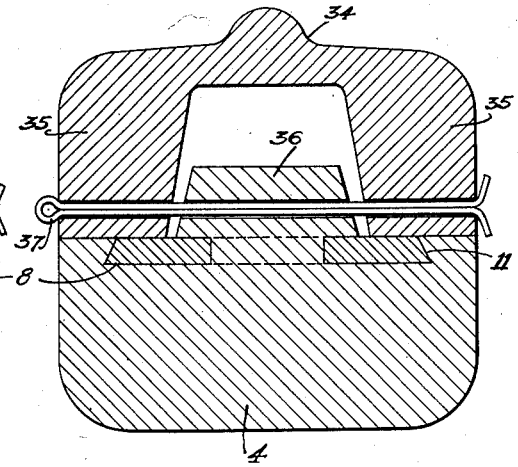
Fig. 6 is a transverse sectional view similar to Fig. 5 but showing another type of head.

In Fig. 6 I have shown another form of head 34 which has heavy sections 35 to engage the back of the shoe on opposite sides of the lugs 36 and these sides and lugs are provided with alining openings to receive the keys 37.

In Fig. 1 the face plate has an opening 38 and the head has a recess 39 to receive the attaching lug 5, and in Fig. 4 the head has a recess 40 to receive the attaching lug.

In practice the shoe is hung on the head in substantially upright position and a break in the body usually occurs at the lower side of the attaching lug. Heretofore the part of the body below the break has been held in place by the reenforce back and, as before stated, the back has been subjected to the effects of vibration, shocks and jars at the break in the body with the result that the back sometimes breaks and the lower part of the shoe falls away and the shoe must be replaced. My invention provides anchorage from the body to the head additional to the reenforce back and this not only insures retention of a broken part of the body on the head but it also assists in holding the shoe rigidly on the head to reduce the effects of vibration, shocks and jars. The keys may be in the form of cotter pins as shown or other suitable keys may be used. These keys pass transversely through parts of the body of the shoe and the head and, in addition to the functions hereinbefore mentioned, they insure accurate alinement of the shoe in the head and with the wheel.

I have illustrated the invention in a simple embodiment with a common cast iron car shoe but I reserve the right to embody the invention in other types of shoes and heads and to make such changes in the form, construction and arrangement of parts as may be necessary for this purpose or for other purposes within the scope of the following claims:

I claim:

1. The combination of a brake head having openings in the face thereof, a brake shoe comprising a body, an attaching lug, projections on the body on opposite sides of said attaching lug and extending into said openings in the head, a fastening key passing through the head and the attaching lug and bearing on some of said projections on the body, and keys passing transversely through the head and said projections on the body to anchor the shoe on the head.

2. The combination of a brake shoe having a centrally disposed lug, and end lugs and guide lugs at the ends of the shoe, a brake head engaging the back of the shoe between the end lugs and having a recess to receive the attaching lug, and parts located at the sides of the guide lugs, said parts and guide lugs having aligned transverse openings, a longitudinal key passing through the brake head and the attaching lug and fastening the shoe to the head, and transverse keys extending through said openings and holding the end portions of the shoe rigidly against the head.

3. The combination of a brake shoe having a centrally disposed attaching lug, and end lugs and guide lugs at the ends of the shoe, a brake head engaging the back of the shoe between the end lugs and having a recess to receive the attaching lug, and parts located at the sides of the guide lugs, said parts and guide lugs having aligned transverse openings, a longitudinal key passing through the brake head and the attaching lug and fastening the shoe to the head, a reenforce back embedded in the back of the body to hold the parts of the body together when fractured, said back having openings to permit the body metal to flow therethrough during the casting operation and form the guide lugs, and transverse keys extending through said openings and holding the end portions of the shoe rigidly against the head and anchoring parts of the body when fractured directly to the head.

4. The combination of a brake shoe having a centrally disposed attaching lug, and end lugs and guide lugs at the ends of the shoe, a brake head engaging the back of the shoe between the end lugs and having a recess to receive the attaching lug, and a face plate provided with openings to receive the attaching lug and guide lugs, said guide lugs and the parts of the face plate at the sides of the guide lugs having aligned transverse openings, a longitudinal key passing through the brake head and the attaching lug and fastening the shoe to the head, and transverse keys extending through said openings and holding the end portions of the shoe rigidly against the head.

5. The combination of a brake shoe having a centrally disposed attaching lug, and end lugs and guide lugs at the ends of the shoe, a brake head engaging the back of the shoe between the end lugs and having a recess to receive the attaching lug, and a face plate provided with openings to receive the attaching lug and guide lugs, said guide lugs and the parts of the face plate at the sides of the guide lugs having aligned transverse openings, said shoe having bearing lugs between the attaching lug and the guide lugs and said face plate having openings to receive said bearing lugs, the bearing lugs and the parts of the face plate at the sides of the bearing lugs having aligned transverse openings, a longitudinal key passing through the brake head and the attaching lug and bearing on said bearing lugs and fastening the shoe to the head, and transverse keys extending through said transverse openings and holding the shoe rigidly against the head and anchoring parts of the body when fractured directly to the head.

6. The combination of a brake shoe having a body, a centrally disposed attaching lug, and end lugs and guide lugs at the ends of the shoe, a brake head engaging the back of the shoe between the end lugs and having a recess to receive the attaching lug and having toes at its ends engaging the back of the shoe at the sides of the guide lugs, said guide lugs and toes having aligned transverse openings, a longitudinal key passing through the brake head and the attaching lug and fastening the shoe to the head, and transverse keys extending through said transverse openings and holding the end portions of the shoe rigidly against the head and anchoring said end portions directly to the head when the body of the shoe becomes fractured.

FITZ WILLIAM SARGENT.